United States Patent Office.

FRITZ ACH, OF MANNHEIM, ASSIGNOR TO C. F. BOEHRINGER & SOEHNE, OF WALDHOF, NEAR MANNHEIM, GERMANY.

ISOEUGENOL BENZYL-ETHER AND PROCESS OF PREPARING THE SAME.

SPECIFICATION forming part of Letters Patent No. 487,205, dated November 29, 1892.

Application filed October 7, 1892. Serial No. 448,148. (No specimens.)

*To all whom it may concern:*

Be it known that I, FRITZ ACH, a citizen of the German Empire, residing at Mannheim, in the Grand Duchy of Baden and German Empire, have invented a certain new and useful Compound known as Isoeugenol Benzyl-Ether and the Process of Preparing the Same; and I do hereby declare the following to be a full, clear, and exact description of the invention, such as will enable others skilled in the art to which it appertains to make and use the same.

My invention relates to the preparation from eugenol of a new compound used in the preparation of vanillin, and which I term "isoeugenol benzyl-ether;" and for this purpose my invention consists in the method, steps, and features described in the specification, and pointed out in the claims annexed thereto.

In preparing vanillin from isoeugenol it is necessary to protect the phenol group of the latter during the oxidation that has to be effected. Heretofore this was effected by the introduction of organic acid residues, which after the oxidation could be readily separated from the vanillin derivatives obtained. With this process it was always necessary before the introduction of the organic acid residue to convert the eugenol with more or less difficulty into isoeugenol and to isolate the latter in a pure condition. I have succeeded by the introduction of certain alcoholic residues into the eugenol—such, for example, as the benzyl group—in obtaining derivatives of eugenol which allow of a ready transformation into derivatives of isoeugenol without requiring the previous isolation of the isoeugenol. These derivatives offer the advantage in the preparation of the vanillin of containing a phenol group which is protected against oxidation and that after the oxidation has been effected the separation thereof can be readily effected.

In the following will be described what I consider the best manner of carrying out my invention, and which consists in the isoeugenol benzyl-ether and the process of preparing the same from eugenol benzyl-ether.

The raw material used in this process is eugenol benzyl-ether, which itself forms the subject-matter of my application, Serial No. 439,029, filed July 5, 1892, and the preparation of which is briefly as follows: One kilogram of eugenol is dissolved in three kilos rectified spirits, and to this are added, first, three hundred and fifty grams caustic potash dissolved in a small quantity of water, and, secondly, eight hundred grams of benzyl chloride, (or corresponding molecular quantities of benzyl iodide or bromide,) and the whole is heated on the water bath with a reflux cooler. The greater portion of the spirits is distilled off, and by the addition of water eugenol benzyl-ether, which separates as a heavy oil, is precipitated.

For separating any eugenol that may not have been converted the oil is shaken up with dilute alkali, and the eugenol benzyl-ether thus purified is then distilled in a partial vacuum.

The eugenol benzyl-ether as thus obtained is a colorless oil which solidifies in strong prisms having a melting-point of 29° to 30° centigrade. Its formula is:

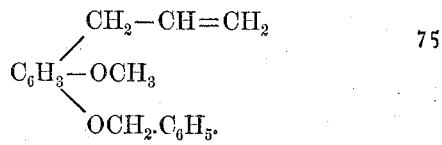

In order to obtain the isoeugenol benzyl-ether, which is the particular subject-matter of this application, I proceed as follows: One kilogram eugenol benzyl-ether (preferably such as is obtained by the preceding process) is dissolved in five kilograms rectified spirits and 2.5 kilograms of pulverized caustic potash are added and the whole is then kept at the boiling-point for from sixteen to twenty-four hours in a reflux cooler. The greater part of the alcohol is then distilled off and water is added to the residue, whereupon a brown-colored oil separates on the surface of the aqueous alkaline solution, and which soon solidifies to a yellowish-brown crystalline mass.

This can be purified by pressing and recrystallizing from alcohol, thus obtaining isoeugenol benzyl-ether in fine felted needles having the melting-point of 58° to 59°. Its formula is:

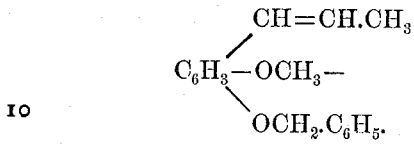

From this isoeugenol benzyl-ether I obtain vanillin by the process set forth in my application, Serial No. 425,941, filed March 22, 1892, which process, however, forms no part of the present invention.

I do not herein claim the eugenol benzyl-ether or the process of obtaining the same, inasmuch as the same, as already stated above, constitutes the subject-matter of another application filed by me July 5, 1892, Serial No. 439,029.

While I consider the above the preferable manner of carrying out my invention, I desire it to be understood that the process thus set forth may be modified in many particulars without departing from the essence of my invention. Thus, for example, as already stated, instead of the benzyl chloride employed in the first step or sub-process, I may employ other halogen compounds of benzyl, as benzyl iodide or bromide, and instead of the caustic potash employed in both steps or sub-processes I may sometimes use other alkali hydrates. It is also to be noted that the eugenol derivatives herein set forth may be produced by other processes and in other ways than those herein set forth. I do not, therefore, desire to be limited to the exact details and steps hereinbefore set forth; but

What I claim, and desire to secure by Letters Patent, is—

1. The process which consists in dissolving eugenol benzyl-ether in rectified spirits, adding thereto alkali hydrate, and keeping the whole at the boiling-point for some time, substantially as set forth.

2. The process which consists in dissolving eugenol benzyl-ether in rectified spirits, adding thereto caustic potash, and keeping the same at the boiling-point for from sixteen to twenty-four hours, substantially as set forth.

3. The process which consists in dissolving engenol benzyl-ether in rectified spirits, adding thereto alkaline hydrate, and keeping the mixture at the boiling-point for some time, then partially distilling off the alcohol, and adding water to the residue, substantially as set forth.

4. The process which consists in dissolving eugenol benzyl-ether in alcohol, adding thereto alkali hydrate, keeping the mixture at the boiling-point for some time, then partially distilling off the alcohol and adding water to the residue, and finally purifying the resulting isoeugenol benzyl-ether, which is a yellowish-brown crystalline mass, by pressing and recrystallizing from alcohol, substantially as set forth.

5. As a new compound, isoeugenol benzyl-ether having the formula hereinbefore stated, crystallizing in fine felted needles, and having a melting-point of 58° to 59° centigrade, substantially as set forth.

In testimony whereof I affix my signature in presence of two witnesses.

FRITZ ACH.

Witnesses:
CARL WÜRTZ,
FERDINAND BOPP.